US008265240B2

(12) United States Patent
Langgood et al.

(10) Patent No.: US 8,265,240 B2
(45) Date of Patent: Sep. 11, 2012

(54) SELECTIVELY-EXPANDABLE SPEAKERPHONE SYSTEM AND METHOD

(75) Inventors: John K. Langgood, Cary, NC (US); Thomas F. Lewis, Raleigh, NC (US); Kevin Michael Reinberg, Chapel Hill, NC (US); Kevin S. D. Vernon, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 1239 days.

(21) Appl. No.: 12/035,239

(22) Filed: Feb. 21, 2008

(65) Prior Publication Data

US 2009/0214010 A1 Aug. 27, 2009

(51) Int. Cl.
*H04M 11/00* (2006.01)

(52) U.S. Cl. ........... 379/110.01; 379/90.01; 379/202.01; 455/416

(58) Field of Classification Search ............. 379/110.01, 379/90.01, 93.04, 93.05, 93.06, 93.09, 93.11, 379/202.01; 455/416, 569.1; 348/14.08–14.12; 709/204
See application file for complete search history.

(56) References Cited

U.S. PATENT DOCUMENTS

| | | | | |
|---|---|---|---|---|
| 5,434,913 | A | 7/1995 | Tung et al. | |
| 6,219,645 | B1 | 4/2001 | Byers | |
| 6,839,417 | B2 | 1/2005 | Weisman et al. | |
| 6,885,989 | B2 | 4/2005 | McLean et al. | |
| 2005/0153692 | A1 * | 7/2005 | Hwang et al. | 455/434 |
| 2007/0117556 | A1 | 5/2007 | Rogalski | |
| 2007/0260682 | A1 | 11/2007 | Guccione | |
| 2009/0052646 | A1 * | 2/2009 | McGowan et al. | 379/202.01 |
| 2009/0253418 | A1 * | 10/2009 | Makinen | 455/416 |

OTHER PUBLICATIONS

Author unknown, Abit iDone and AirPace Music; www.hothardware.com. 2 pages, printed on Jan. 8, 2008.

ClearOne HDConference™ Technology—Delivering the Ultimate High-Definition A Conferencing Experience, ClearOne, 2 pages, www.clearone.com.

* cited by examiner

*Primary Examiner* — Melur Ramakrishnaiah

(74) *Attorney, Agent, or Firm* — Cynthia G. Seal; Jeffrey L. Streets

(57) ABSTRACT

According to one embodiment, a selectively-expandable speakerphone system allows one or more portable computers to automatically, wirelessly interface with a speakerphone console via an audio access point. A scheduling module initiates the conference call at a scheduled time, whereupon the wireless network interface of each portable computer is automatically switched to an SSID uniquely associated with the audio access point, for connecting to the speakerphone console. The audio signals generated by the laptop microphones are mixed with any audio signal generated by an optional microphone on the speakerphone console, and the mixed audio signals are transmitted over the telephone line. Incoming audio signals are passed to the speakerphone console and wirelessly transmitted to the portable computers for substantially simultaneous playback on the respective loudspeakers.

17 Claims, 3 Drawing Sheets

SELECTIVELY-EXPANDABLE SPEAKERPHONE SYSTEM AND METHOD

BACKGROUND OF THE INVENTION

1. Field of the Invention

The present invention relates to telephone systems, conference calling, and computer networking.

2. Description of the Related Art

A speakerphone is a type of telephone or telephone subsystem having a microphone and loudspeaker that can be used "hands-free" from a distance, as an alternative to using a handset. A speakerphone is commonly referred to as a conference phone because it can be used by multiple participants to conduct conference calls. During a conference call, the microphone detects the voices of the participants and other sound originating within detectable range of the microphone, and the speakerphone transmits the resulting audio signal over a telephone line where the detected sound can be reproduced at the other end of the telephone line. Incoming audio signals received over the telephone line by the speakerphone are reproduced as sound by the loudspeaker.

Many speakerphone systems perform poorly in a conference call setting due to the range of distances over which participants are typically situated from the speakerphone. Speakerphone performance is also adversely affected by extraneous noise sources that often accompany a conference setting. FIG. 1 is a plan view of an exemplary conference setting illustrating some of these factors affecting audio quality of a conference call. The site of the conference in this example is a conference room with an oblong conference table 10 and a speakerphone 12 centrally positioned on the conference table 10. Several users 14 are seated around the conference table 10 at various distances from the speakerphone 12. The distances of three of the users 14 from the speakerphone 12 are labeled, by way of example, as d1, d2, and d3 (listed in decreasing order). If the sensitivity of the microphone and volume of the loudspeaker are optimally set for the nearest user 14 (at the distance d3), the user 14 seated the furthest distance d1 from the speakerphone 12 has to speak more loudly and may find it harder to hear the speakerphone 12. Conversely, if the microphone sensitivity and loudspeaker volume are optimally set for the furthest user 14 (at the distance d1), the voice of the nearer users (at distances d1 and d2) may be excessively loud or distorted. Increasing the microphone sensitivity of the speakerphone 12 will also amplify extraneous noise sources, such as the overhead projector 16, which will further diminish the quality of the audio transmission.

A number of solutions have been proposed to overcoming some of these problems affecting call quality. For example, some speakerphones are provided with multiple circumferentially arranged microphones, intended to provide more uniform sensing of sound from different positions. Some speakerphones include wired satellite microphones that can be routed to each of the various seating positions of a conference table. Such solutions can be effective, but are typically more expensive to the consumer. These solutions also introduce extra components, such as cumbersome wires provided with satellite speakers. Improving the acoustics of the room in which a conference call is conducted might also improve the audio quality of a conference call, but this solution is even less likely to be cost-effective. What is needed, therefore, is a way to improve the call quality of a conference call, preferably without requiring a great deal of additional hardware and expense.

SUMMARY OF THE INVENTION

The present invention includes embodiments of systems and methods whereby any number of portable computers may wirelessly patch-in to a conference call. One embodiment provides a selectively expandable speakerphone system including a speakerphone console, one or more portable computers, and a wireless audio access point for connecting the portable computers to the speakerphone console. The speakerphone console is connected to a telephone system for transmitting and receiving audio signals over a telephone line. The portable computers each have an included microphone and loudspeaker, and a wireless networking interface configured for communicating on any of a plurality of distinct wireless local area networks. The wireless audio access point connects the portable computers with the speakerphone console on a selected one of the wireless local area networks. Audio signals generated by the microphone are communicated to the speakerphone console for substantially simultaneous transmission over the telephone line. Audio signals received over the telephone line by the speakerphone console are communicated to all of the one or more portable computers for substantially simultaneous playback on the loudspeakers.

Another embodiment provides a computer program product comprising computer usable program code on a computer usable medium for conducting a conference call. The computer program product includes computer usable program code for connecting a plurality of portable computers to a speakerphone console on a wireless local area network, for generating an audio signal using the microphone on each portable computer, for wirelessly routing and transmitting the audio signal generated by the microphone of each portable computer to the speakerphone console for substantially simultaneous transmission over a telephone line, and for receiving and routing an audio signal received over the telephone line by the speakerphone console to the loudspeaker of each portable computer for substantially simultaneous playback on the loudspeakers.

Other embodiments, aspects, and advantages of the invention will be apparent from the following description and the appended claims.

DETAILED DESCRIPTION OF PREFERRED EMBODIMENTS

The present invention provides systems and methods whereby any number of portable computers may wirelessly patch-in to a conference call. The microphone and loudspeaker included on each portable computer are used to provide audio input and output in lieu of, or in addition to, the microphone and loudspeaker on a conventional speakerphone. For example, one embodiment provides a selectively-expandable speakerphone system wherein one or more portable computers automatically, wirelessly interface with a speakerphone console via an audio access point operating according to a service set identifier (SSID) uniquely associated with the audio access point. In another embodiment, a scheduling module initiates the conference call at a scheduled time, whereupon the wireless network interface of each portable computer is automatically switched to the associated SSID for connecting to the speakerphone console. The speakerphone console may also include a microphone and loudspeaker for conference participants who are not in proximity to a laptop. The audio signals generated by the laptop microphones are mixed with any audio signal generated by the microphone on the speakerphone console, and the mixed audio signals are transmitted over the telephone line. Audio signals incoming from the telephone line are passed to the speakerphone console and wirelessly transmitted to the portable computers for substantially simultaneous playback on the respective loudspeakers. In the exemplary embodiments that follow, it is assumed that the portable computers are laptop computers, which often include an integrated microphone and loudspeaker. However, it should be recognized that other portable computers such as personal digital assistants (PDAs) may be used instead of laptops.

Figure 1:
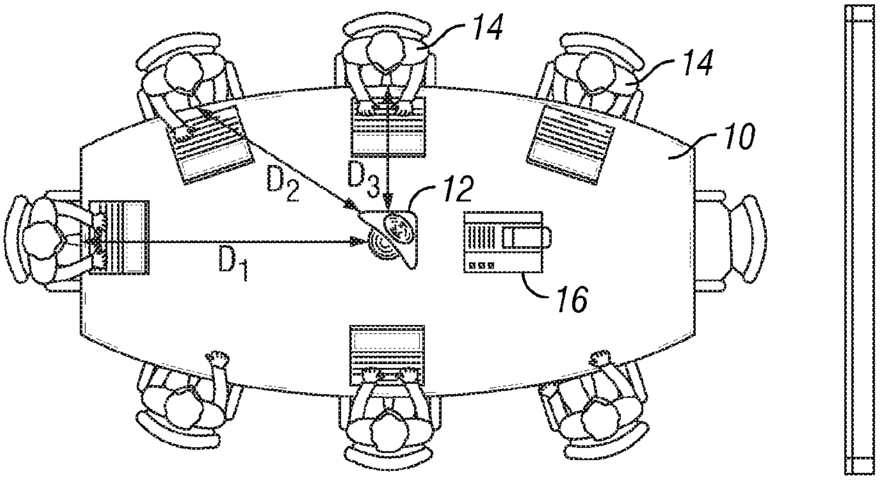
FIG. 1 (Prior Art)
FIG. 1 is a plan view of a typical conference setting.
Figure 2:
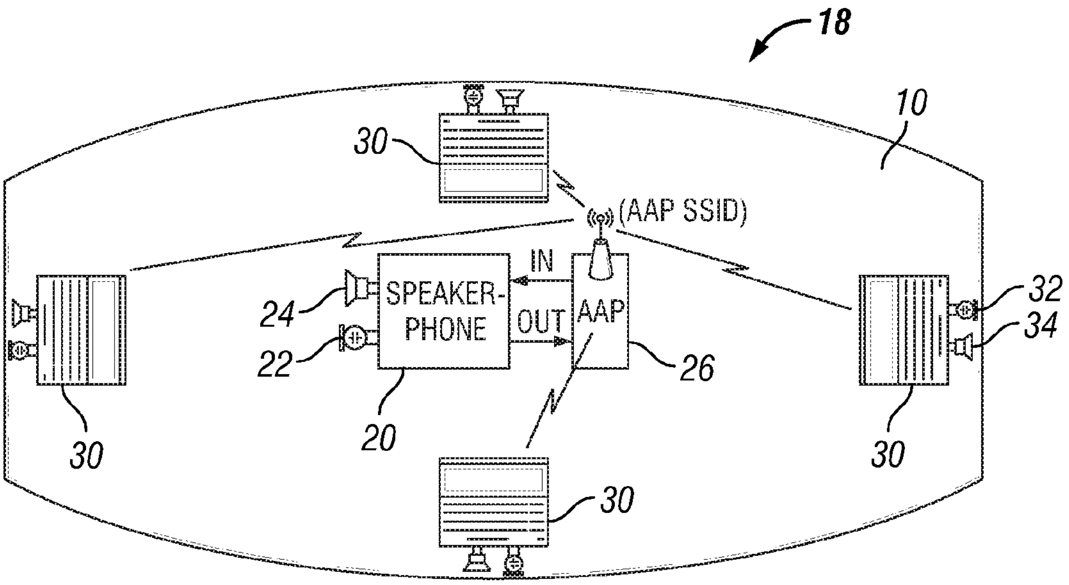
FIG. 2 is a schematic diagram of a selectively-expandable speakerphone system situated in an exemplary conference setting according to one embodiment of the invention.

FIG. 2 is a schematic diagram of a selectively-expandable speakerphone system 18 in an exemplary conference setting according to one embodiment of the invention. The speakerphone system 18 includes a speakerphone console 20 which can be used in a conventional manner, if desired, to conduct a conference call. The speakerphone console 20 includes a microphone 22 and a loudspeaker 24 and may be connected to a telephone line (not shown). As with a conventional speakerphone console, the microphone 22 detects the voices of users seated around the conference table 10 and the speakerphone console 20 transmits the resulting audio signal over the telephone line. Incoming audio signals are received over the telephone line and routed through the speakerphone console 20 to the loudspeaker 24, which converts the incoming audio signal to sound at a volume that can be heard across the conference table 10. Other, conventional functionality includes user-adjustable audio settings such as the sensitivity of the microphone 22 and the volume of the loudspeaker 24 on the speakerphone console 20.

Unlike a conventional speakerphone system, however, the speakerphone system 18 also optionally allows any number of portable computers ("laptops") 30 to connect or "patch in" to the conference call by wirelessly connecting the laptops 30 to the speakerphone console 20. In particular, a wireless audio access point ("AAP") 26 connects the laptops 30 to the speakerphone console 20 using a wireless local area network ("WLAN"). In this embodiment, the WLAN is characterized by a particular service set identifier (the "AAP SSID") uniquely associated with the AAP 26. The AAP SSID is distinct from other SSIDs on which the laptops 30 may operate, so that the laptops 30 may also independently connect to other wireless networks. Each laptop 30 includes a laptop microphone 32 and a laptop loudspeaker 34. Each laptop microphone 32 detects the voice of the laptop user and wirelessly transmits the resulting audio signal to the AAP 26. The AAP 26 routes the wirelessly transmitted signal into an audio input ("IN") of the speakerphone console 20. The audio signals wirelessly transmitted from the laptops 30 to the speakerphone console 20 may then be mixed and/or transmitted over the telephone line concurrently with any audio signals generated at the microphone 22 of the speakerphone console 20, itself. Likewise, the speakerphone console 20 receives an incoming audio signal from the telephone line and outputs the incoming audio signal to the AAP 26, which transmits the incoming audio signal to all participating laptops 30 for substantially simultaneous playback on the laptop loudspeakers 34.

Thus, users with laptops 30 can participate in the conference call using the microphones 32 and loudspeakers 34 supplied with their laptops, in lieu of using the microphone 22 and loudspeaker 24 of the speakerphone console 20 located further across the conference table 10. This aspect helps normalize the audio quality among the various conference call participants because laptop users are usually at a more predictable distance and position relative to their laptops than they are with respect to a speakerphone. As a result, the voices detected with the laptop microphones 32 at the conference site will be reproduced at the other end of the telephone line with a more consistent and uniform sound level. Likewise, the laptop loudspeakers 34 may provide more consistent audio among the various laptop users. Meanwhile, others can still participate in the conference call even without a laptop by interacting with the speakerphone console 20 in a conventional manner. The ability to interact with the speakerphone console 20 in a conventional manner is particularly helpful in certain contingencies, such as to provide a backup in the case that one of the laptops fails or loses the connection to the AAP. This functionality is also useful when one of the conference participants needs to move away from his or her laptop, such as to stand up and give a presentation.

Figure 3:
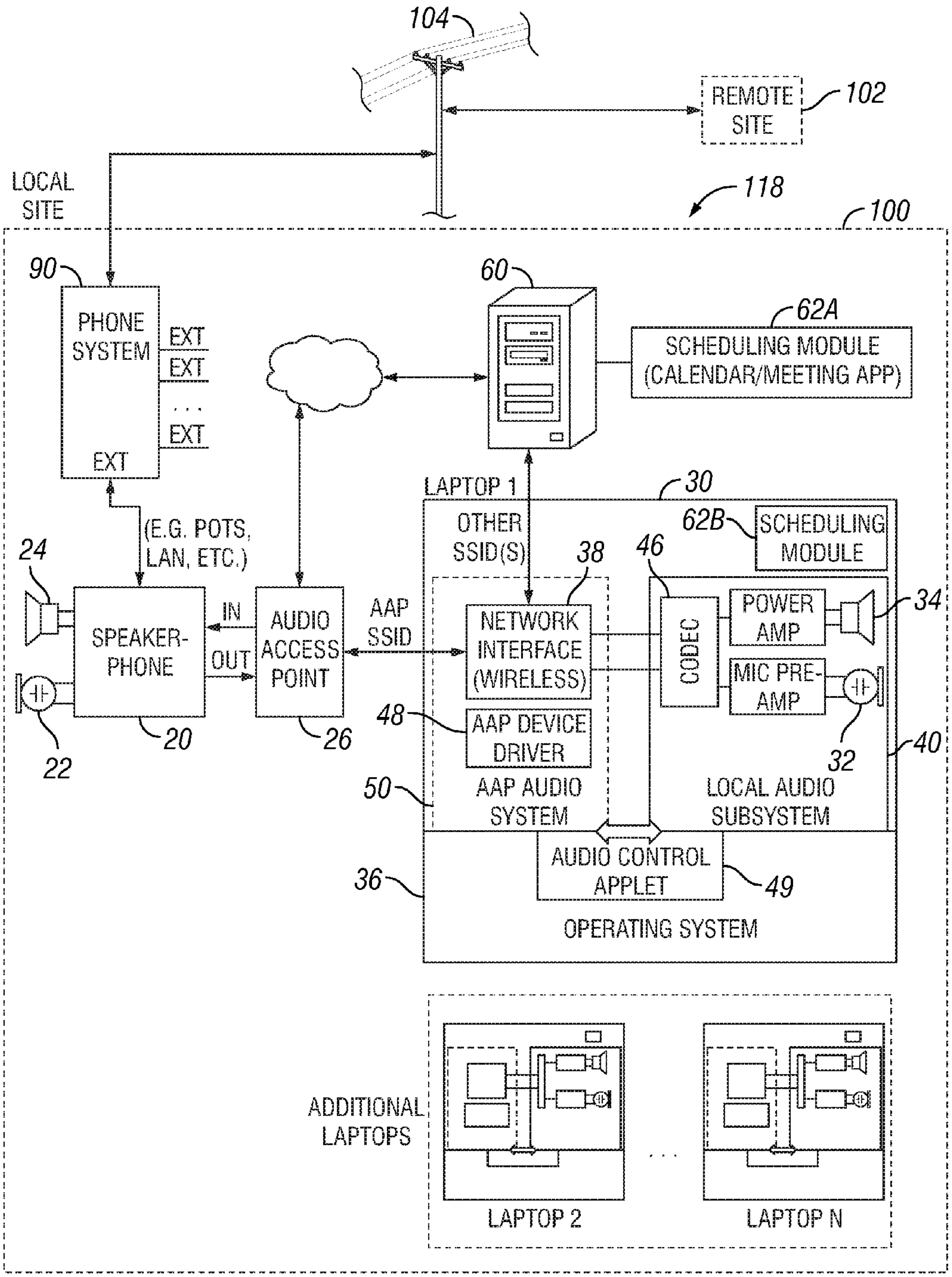
FIG. 3 is a schematic diagram of a more detailed implementation of the speakerphone system of FIG. 2.

FIG. 3 is a detailed schematic diagram of one implementation 118 of the selectively expandable speakerphone system 18 generally shown in FIG. 2. The system 118 is set up at a local site 100 for making calls to a remote site 102 over a telephone line, such as a landline 104. The local site 100 may be, for example, an office building, and more specifically may be the conference room of an office building. The remote site 102 may be any other site that may be called on a telephone line, such as another office building. The landline 104, itself, is a type of telephone line known in the art that travels primarily through a solid medium, such as metal wire or optical fiber, as opposed to a mobile cellular line, where the medium used is primarily the airwaves. A telephone system 90 includes hardware known in the art for connecting to the landline 104. For example, at an office building, the telephone system 90 may include one or more telephone extensions (labeled "ext") for connecting the speakerphone console 20 to the landline 104. The telephone system 90 may also include a controller having hardware and/or software elements known in the art for selectively routing incoming and outgoing calls between the various telephone extensions. The speakerphone console 20 may be connected to the telephone system with conventional means, such as with a telephone cable known in a field colloquially referred to as POTS (plain-old telephone service), by LAN, by ISDN, or other means known in the art for connecting a speakerphone console to a landline. Although a landline has been used in this illustration, it should be recognized that the mode of transmitting the telephone signal from the local site 100 to the remote site 102 may include wireless network, satellite networks, landlines, VOIP, and any combination of known transmission media.

One of the laptops 30 (labeled "Laptop 1") is shown in enlarged view and labeled in detail. Any number "N" of additional laptops ("Laptop 2" to "Laptop N") may be included, and to simplify discussion are assumed to be substantially identically to Laptop 1. A wireless subsystem that includes a wireless network interface 38 is provided with each laptop 30, for wirelessly connecting to the AAP 26 using the AAP SSID to exchange audio signals with the AAP 26. The wireless network interface 38 is also configured to selectively switch to other wireless devices on other distinct WLANs using other SSIDs. For example, when not connected to the AAP 26 using the AAP SSID, the wireless network interface 38 may connect to the server 60 on another SSID distinct from the AAP SSID, such as for browsing the Internet or a company's intranet. In another embodiment, an additional, distinct WLAN subsystem could be added to the laptop 30 to simultaneously communicate with the AAP 26 using the wireless network interface 38 and to another network using the additional WLAN. Thus, for example, with an additional WLAN, the laptops 30 may be connected to the AAP SSID during a conference call and to a server 60 using another SSID for browsing the company intranet or the Internet during the conference call. In yet another embodiment, the AAP 26 may connect to the LAN, itself, and all WLAN traffic (e.g. Internet plus teleconference audio) may be routed through the AAP 26. In another alternative embodiment, the APP 26 may be a Bluetooth® access point configured to communicate with the laptops 30 using Bluetooth®, so that the wireless network interface 38 is available for WLAN traffic.

Each laptop 30 includes memory for storing a conventional operating system 36, such as Microsoft Windows®, LINUX, or even Mac OS®, for managing the various laptop resources. A local audio subsystem 40 includes the laptop microphone 32, a microphone pre-amp 42, the loudspeaker 34, a power-amplifier 44, and a codec 46. The codec 46 is used for encoding and decoding signals, such as for digitally encoding the audio signals generated by the microphone 32 for transmission on the wireless network interface 26 and for decoding digital audio signals to be amplified by the power amplifier 44 for playback on the loudspeaker 34. The local audio subsystem 40 may be used by any of a variety of applications installed on the operating system 36, such as multimedia applications that incorporate audio input from the microphone 32 and/or audio output to the loudspeaker 34. The functionality of the local audio subsystem 40 residing on each laptop 30 is, therefore, not limited to use as part of the speakerphone system 118.

According to the invention, an additional, "AAP audio subsystem" 50 can be selectively generated by an AAP device driver 48 for use as part of the selectively-expandable speakerphone system 118. The AAP audio subsystem 50 is a "virtual" audio subsystem, in that it is seen by the operating system 36 as being separate from the local audio subsystem 40. The audio control applet 49 selectively connects the local audio subsystem 40 to the AAP audio subsystem 50, so that signals sent to and received by the AAP audio subsystem 50 are communicated using the AAP SSID with the wireless network interface 38. Consequently, when the virtual AAP audio subsystem 50 is active, the audio signals generated at the microphone 32 are diverted to the wireless network interface 38 for transmission to the AAP 26 and eventually over the landline 104, and incoming audio signals are routed to the loudspeaker 24 and transmitted by the AAP to the wireless network interface 38 for sending to the loudspeakers 34. The audio control applet 49 controls the routing of these signals. The audio control applet 49 may also control the audio settings for each laptop 30. These audio settings may be automatically adjusted by the audio control applet 49 or user-adjusted. For example, the sensitivity of each laptop microphone 32 may be adjusted to reliably detect the voice of its user, without being overly sensitive to the voices of other, more distant users at the conference site and to extraneous noises. Likewise, the volume of the loudspeaker 34 of each laptop 30 may be adjusted for comfortable listening by its user, without being easily heard by the other user. These audio settings may be factory-set based on expected speaking volumes of the users and the expected positioning of a user relative to the laptop 30.

The signals transmitted by all of the laptops 30 to the AAP are mixed for substantially simultaneous transmission over the landline 104 so that the net sound detected at the local site 100 by both the microphone 22 of the speakerphone console 20 and the laptop microphones 32 are received at the remote site 102 and reproduced synchronously at the remote site 102. Prior to transmission, these separate audio signals may be mixed into a single, digital composite audio signal representative of all the sound detected by the speakerphone system 118 at the local site 100. Also, the audio signal received over the landline 104 at the local site 100 is transmitted substantially simultaneously by the AAP 26 to all of the laptops 30 and to the speakerphone console 20, so that the sound detected at the remote site 102 is reproduced substantially simultaneously at each of the laptop speakers 34 and the loudspeaker 24 on the speakerphone console. This processing of the transmitted and received audio signals provides at least an approximately real-time reproduction of sound (possibly with some short delay inherent to signal transmission over a distance) at both the local site 100 and the remote site 102.

A scheduling module 62A is optionally installed on the server 60, and cooperating, counterpart scheduling modules 62B are optionally installed on each laptop 30, for scheduling and at least partially automating conference calls. The server 60 may selectively interface with the laptops 30 and with the AAP 26, possibly using separate WLANs characterized by different SSIDs. The laptops 30 may communicate with one another and with the server 60, as needed, to schedule conference calls. For example, users may interface with the scheduling modules 62B on their laptops 30 using input peripherals such as a keyboard and mouse, to suggest, negotiate, and/or accept proposed conference call times with other users. A conference call may be scheduled, and conference parameters such as the scheduled conference time, the intended participants ("invitees"), and the telephone number of the remote site 102 may be centrally stored on the scheduling module 62A and/or the scheduling module 62B. At the scheduled meeting time, the scheduling modules 62A, 62B may cooperate to initiate the conference call and connect the invitees' laptops 30 with the selectively-expandable speakerphone system 118. For example, at the scheduled conference time, the scheduling module 62A on the server 60 may access the AAP 26 to enable the distinct AAP SSID on the AAP 26. The server 60 may also access the invitees' laptops 30 to engage the AAP device driver 48 and the audio control applet 49, thereby enabling the AAP SSID on the laptops 30 and causing the invitees' laptops 30 to connect to the AAP 26. The audio control applet 49 may monitor the AAP SSID in anticipation of receiving signals from the invitees' laptops 30. When the invitees' laptops are in sufficient proximity to the conference room, which may be determined by detection of a threshold signal strength, the audio control applet 49 may begin to pass audio signals between the laptops 30 and the audio access point 26 as described above. The server 60 may also access the telephone system 90, either directly or through the AAP 26, to place the call to the remote site 102 using the telephone number at the remote site 102.

Figure 4:
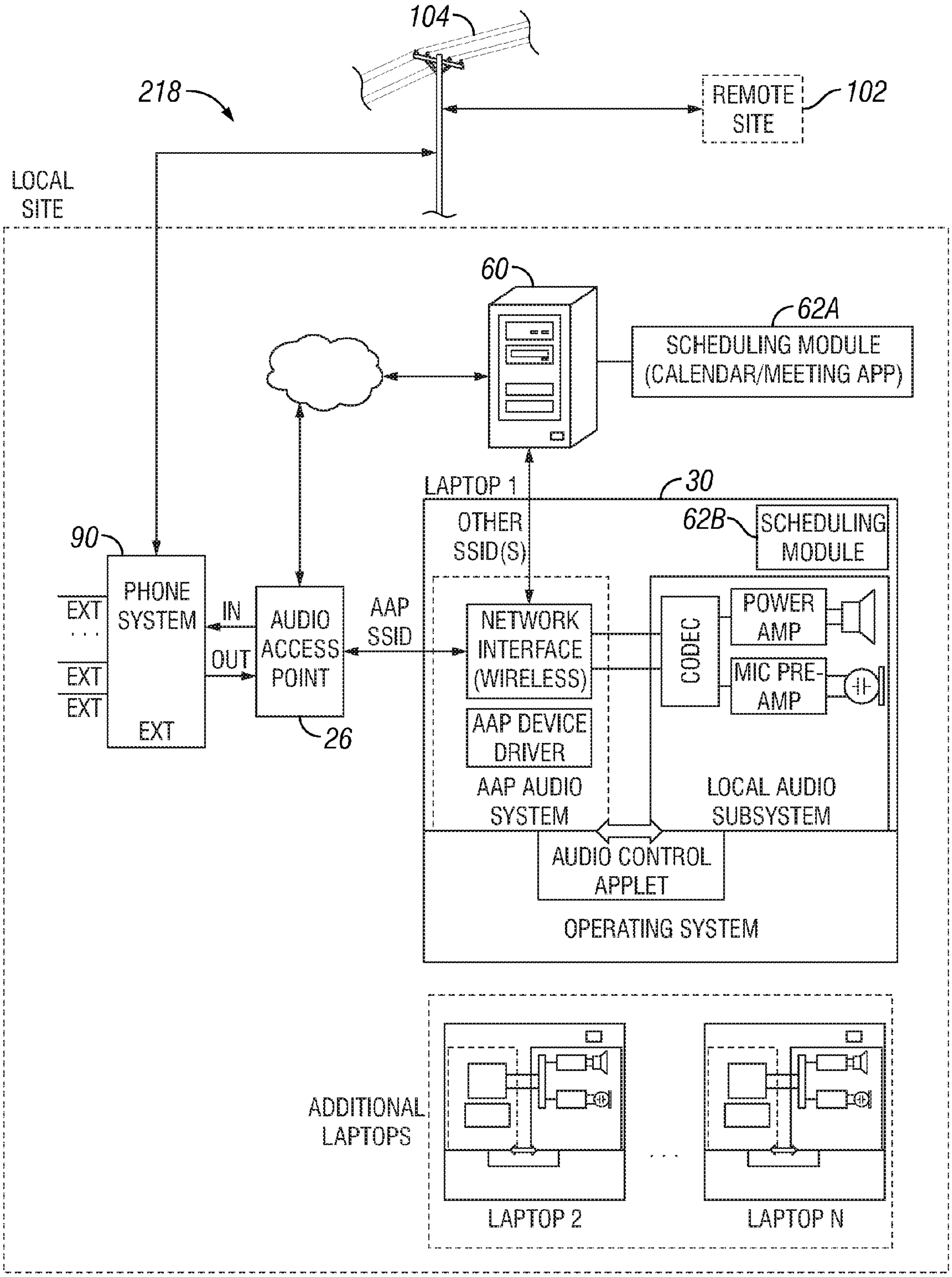
FIG. 4 is a schematic diagram of an alternative implementation of the speakerphone system of FIG. 2.

FIG. 4 is a schematic diagram of an alternative implementation 218 of the speakerphone system 18 in which the speakerphone console 20 of FIG. 3 is omitted. The AAP 26 is instead connected directly to the telephone system 90. When the virtual AAP audio subsystem 50 is active, the audio signals generated at the microphone 32 are again diverted to the wireless network interface 38 for transmission over the landline 104. However, the audio signals generated at the microphone 32 are routed from the AAP 26 directly to the telephone system 90, and not through a speakerphone console. Likewise, incoming audio signals are still diverted from the wireless network interface 38 to the loudspeaker 24 and the loudspeaker 34. However, the incoming audio signals are routed directly from the telephone system 90 to the AAP 26, rather than through a speakerphone console. This alternate implementation 218 is suitable for conference calls wherein it is expected that all invitees will have laptops 30. The system is simplified by virtue of omitting the speakerphone console 20, at the expense of not having the optional access to a conventional speakerphone console for contingencies such as laptop failure.

It should be recognized that the invention in the embodiment discussed above may include both hardware and/or software elements. For example, the operating system 36, the AAP device driver 48, the audio control applet 49, and the cooperating scheduling modules 62A, 62B typically comprise software such as firmware, resident software, microcode, or combinations thereof. The hardware elements on which the software elements reside include various hardware of the laptops 30, the server 60, and the AAP 26.

More generally, the invention can take the form of a computer program product including computer usable program code embodied on a computer usable medium for use by or in connection with a computer (e.g. the laptops 30 and server 60) or any instruction execution system. For the purposes of this description, a computer-usable or computer readable medium can be any apparatus that can contain or store the program for use by or in connection with the instruction execution system, apparatus or device. The medium can be, for example, an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A selectively expandable speakerphone system, comprising:

a speakerphone console connected to a telephone system for transmitting and receiving audio signals over a telephone line;

one or more portable computers each having an included microphone and loudspeaker, and a wireless networking interface configured for communicating on any of a plurality of distinct wireless local area networks;

a wireless audio access point for connecting the portable computers with the speakerphone console on a selected one of the wireless local area networks, communicating audio signals generated by the microphone to the speakerphone console for substantially simultaneous transmission over the telephone line, and communicating audio signals received over the telephone line by the speakerphone console to all of the one or more portable computers for substantially simultaneous playback on the loudspeakers; and an audio control applet disposed on each portable computer, configured for automatically diverting the audio signals generated by the microphone to the speakerphone console for transmission over the telephone line and for automatically diverting audio signals received over the telephone line by the speakerphone console to the portable computer when the portable computer is connected to the selected wireless local area network.

2. The system of claim 1, wherein the audio control applet is further configured to selectively adjust one or both of microphone sensitivity and loudspeaker volume in response to user input.

3. The system of claim 1, wherein each of the plurality of wireless local area networks on which the wireless network interface is configured for communicating is characterized by a distinct service set identifier.

4. The system of claim 3, further comprising an additional wireless network interface configured for independently communicating on another of the wireless local area networks while remaining connected to the speakerphone console over the selected wireless local area network.

5. The system of claim 1, wherein the portable computers are laptop computers.

6. The system of claim 1, further comprising a server in communication with the portable computers and the audio access point; and a scheduling module disposed on one or both of the server and the portable computers for scheduling call times and automatically causing the portable computers to connect to the speakerphone console using wireless audio access point at the scheduled call times.

7. The system of claim 6, wherein the scheduling application is further configured to automatically initiate telephone calls on the telephone system at the scheduled times.

8. A laptop computer teleconferencing system, comprising:

a plurality of laptop computers each having a microphone, a loudspeaker, and a wireless networking interface configured for communicating on any of a plurality of distinct wireless local area networks;

a wireless audio access point for connecting the laptop computers with a telephone system on a selected one of the wireless local area networks, communicating audio signals generated by the microphones to the telephone system for substantially simultaneous transmission over a telephone line, and communicating audio signals received over the telephone line by the telephone system to all of the laptop computers for substantially simultaneous playback on the loudspeakers; and an audio control applet disposed on each laptop computer, configured for automatically diverting the audio signals generated by the microphone to the telephone system for transmission over the telephone line and for automatically diverting audio signals received over the telephone line by the telephone system to the laptop computer when the laptop computer is connected to the selected wireless local area network.

9. The system of claim 8, wherein the audio control applet is further configured to selectively adjust one or both of microphone sensitivity and loudspeaker volume in response to user input.

10. The system of claim 8, wherein each of the plurality of wireless local area networks on which the wireless network interface is configured for communicating is characterized by a distinct service set identifier.

11. The system of claim 10, wherein each wireless network interface is configured for independently communicating on another of the wireless local area networks while remaining connected to the telephone system over the selected wireless local area network.

12. The system of claim 8, wherein the laptop computers are laptop computers.

13. The system of claim 8, further comprising:

a server in communication with the laptop computers and the audio access point; and a scheduling application disposed on one or both of the server and the portable computers for scheduling call times and automatically causing the laptop computers to connect to the telephone system using the wireless audio access point at the scheduled call times.

14. The system of claim 13, wherein the scheduling application is further configured to automatically initiate telephone calls on the telephone system at the scheduled times.

15. A computer program product comprising a non-transitory computer usable medium including computer usable program code for conducting a conference call, the computer program product including:

computer usable program code for connecting a plurality of portable computers to a speakerphone console on a wireless local area network;

computer usable program code for generating an audio signal using the microphone on each portable computer;

computer usable program code for wirelessly routing and transmitting the audio signal generated by the microphone of each portable computer to the speakerphone console for substantially simultaneous transmission over a telephone line;

computer usable program code for receiving and routing an audio signal received over the telephone line by the speakerphone console to the loudspeaker of each portable computer for substantially simultaneous playback on the loudspeakers; and computer usable program code for automatically diverting the audio signals generated by the microphones to the speakerphone console and for automatically diverting the audio signal received over the telephone line to the portable computers when the portable computers are connected to the selected wireless local area network.

16. The computer program product of claim 15, further comprising:

computer usable program code for scheduling call times; and computer usable program code for automatically causing the portable computers to wirelessly connect to the speakerphone console at the scheduled call time.

17. The computer program product of claim 16, further comprising:

computer usable program code for automatically initiating telephone calls on the telephone system at the scheduled call times.

* * * * *